(12) United States Patent
Zimmermann

(10) Patent No.: US 11,457,035 B2
(45) Date of Patent: Sep. 27, 2022

(54) NETWORK INTRUSION DETECTION SYSTEM AND METHODS WITH STATISTIC PROFILE BASED NETWORK INTERFACE CONTROLLERS

(71) Applicant: Harman Becker Automotive Systems GmbH, Karlsbad (DE)

(72) Inventor: Gerd Zimmermann, Philippsburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 260 days.

(21) Appl. No.: 16/877,025

(22) Filed: May 18, 2020

(65) Prior Publication Data

US 2020/0366701 A1    Nov. 19, 2020

Related U.S. Application Data

(60) Provisional application No. 62/849,774, filed on May 17, 2019.

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC .. H04L 63/1425; H04L 63/1416; H04L 67/12
USPC .......................................................... 726/23
See application file for complete search history.

(56) References Cited

U.S. PATENT DOCUMENTS

| | | | |
|---|---|---|---|
| 6,178,374 B1 * | 1/2001 | Mohlenkamp ... | G08G 1/096716 340/905 |
| 10,017,155 B1 * | 7/2018 | Allouche ................ | B60R 25/32 |
| 2003/0088791 A1 * | 5/2003 | Porras .................. | H04L 63/1408 726/4 |
| 2014/0309866 A1 * | 10/2014 | Ricci ...................... | G06F 21/32 701/36 |
| 2018/0351980 A1 * | 12/2018 | Galula ................ | H04L 63/1416 |
| 2019/0034254 A1 * | 1/2019 | Nataraj ............... | G06F 11/0709 |
| 2019/0104108 A1 * | 4/2019 | Rhee .................. | H04L 63/1425 |
| 2020/0177485 A1 * | 6/2020 | Shurtleff ................ | H04L 67/12 |

* cited by examiner

*Primary Examiner* — Badri Narayanan Champakesan
(74) *Attorney, Agent, or Firm* — McCoy Russell LLP

(57) ABSTRACT

The present disclosure relates to systems, devices and methods for detecting network intrusions. Embodiments are directed to processing vehicle network traffic with known traffic profiles. In one embodiment, violations of the known traffic profiles may be reported. Configurations and processes are also provided for network interface controllers.

18 Claims, 4 Drawing Sheets

NETWORK INTRUSION DETECTION SYSTEM AND METHODS WITH STATISTIC PROFILE BASED NETWORK INTERFACE CONTROLLERS

CROSS-REFERENCE TO RELATED APPLICATION

The present application claims priority to U.S. Provisional Application 62/849,774, entitled "NETWORK INTRUSION DETECTION SYSTEM (NIDS) AND METHODS WITH STATISTIC PROFILE BASED NETWORK INTERFACE CONTROLLERS (NIC)," and filed on May 17, 2019. The entirety of the above-listed application is hereby incorporated by reference for all purposes.

FIELD

The present disclosure relates to systems, methods, and devices for network intrusion detection and to processes and configurations for statistic profile based network interface controllers.

BACKGROUND

Network intrusions can be any unauthorized activity on a computer network. Unwanted activity can waste network resources and threaten security of network data and network devices. There exists a need for network intrusion detection systems and methods to will block the intruders.

As capabilities of vehicles rely on network communication, vehicle configurations include communication abilities with various entities. There also exists a need to improve configurations and processes for intrusion detection in vehicle networks.

SUMMARY

Disclosed and claimed herein are methods, devices and systems for network intrusion detection. Some embodiments are directed to a method for detecting network intrusions. The method includes receiving, by a network interface controller, vehicle network traffic, and processing, by the network interface controller, the vehicle network traffic with known traffic profiles. The method also includes detecting, by the network interface controller, a violation of the known traffic profiles within the vehicle network traffic. The method also includes reporting, by the network interface controller, the violation of the known traffic profile.

Other embodiments are directed to a network interface controller. The network interface controller includes an input configured to receive vehicle network traffic, and a control unit coupled to the input. The control unit is configured to process the vehicle network traffic with known traffic profiles, and detect a violation of the known traffic profiles within the vehicle network traffic. The control unit is also configured to report the violation of the known traffic profile.

Other aspects, features, and techniques will be apparent to one skilled in the relevant art in view of the following detailed description of the embodiments.

It should be understood that the summary above is provided to introduce in simplified form a selection of concepts that are further described in the detailed description.

It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
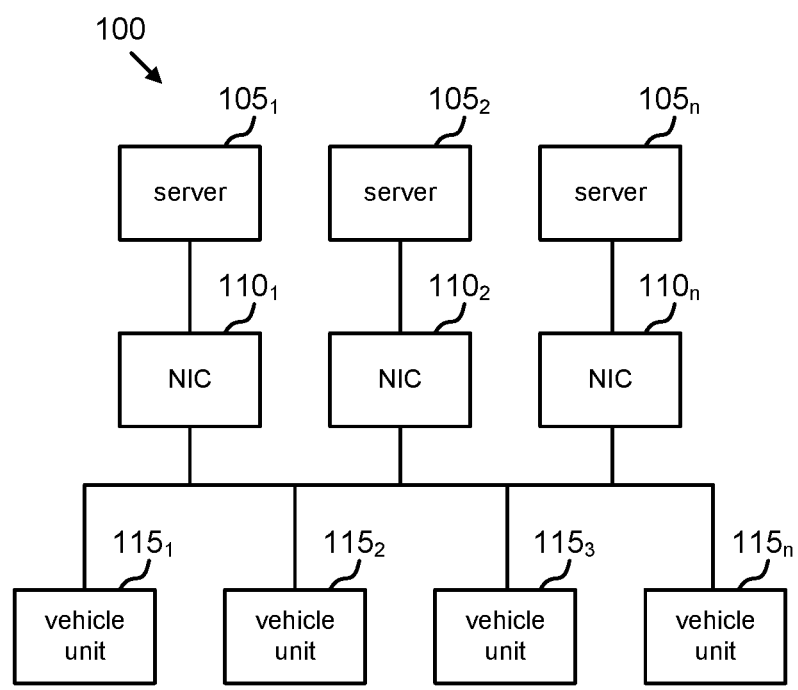
FIG. 1 depicts a graphical representation of a network intrusion detection system, according to one or more embodiments.

One aspect of the disclosure is directed to a network intrusion detection system (NIDS) configured to monitor a network for malicious activity and policy violations. In some embodiments, a NIDS includes one or more device configurations and applications that monitor a network. In some embodiments, a NIDS includes one or more network interface controllers (NIC) configured to provide access to a network (e.g., an Ethernet network). The NIDS may be part of an intrusion detection system (IDS). In other embodiments, the NIDS may be part of an intrusion detection and prevention system (IDPS).

According to some embodiments, at least one known traffic profile (KTP) may be created and/or used to detect intrusions and/or violations of policy for a vehicle network. A NIDS according to one or more embodiments may be provided by a device and/or application that monitors a network for malicious activity or policy violations, wherein the network is monitored using KTPs. KTPs may be determined based on testing of an automotive (e.g., Ethernet) network for possible use cases across many benches and vehicles before a standard operating procedure for the network and KTPs is determined. KTPs may relate to one or more of: communication requests, data exchange, data patterns, authentication, and network data in general. According to some embodiment, KTPs can provide one or more parameters describing acceptable and unacceptable (e.g., violations) characteristics associated with network timing. According to some embodiments, the NIDS can check for transitions of KTP-parameters from one allowed value/range into another allowed value/range. In addition to detection of a violation, KTPs may provide indications of the network violation and be utilized in one or more actions or processes in response to network violations. In addition, one or more KTPs can be utilized concurrently and/or with a co-existing timing relationship relative to each other. In certain embodiments, one or more co-existing KTPs may be excluded from evaluation of network data. One or more KTPs may be combined to provide use case profiling and verification.

According to some embodiments, system configurations as discussed herein can be configured for one or more of a wide area network (WAN) and local area network (LAN). Network traffic in a WAN or LAN may be nondeterministic. As such, possible detection parameters can include known types of attacks (e.g., signature-based detection to recognize bad patterns), and abnormal behavior, such as deviations from a model of "good" traffic. Abnormal behavior detection can often rely on machine learning. In some embodiments, abnormal behavior and/or violations are determined based on one or more timing characteristics of vehicle network data. Timing characteristics may be based on related timing parameters including time synchronization relative to one or more vehicles (e.g., shared vehicle understanding of time), scheduling and traffic shaping (e.g., parameters for exchange of communication packets), communication path selection including bandwidth and time slot selection, and TSN parameters in general.

Processes and device configurations described herein can flag events or scenarios where network traffic violates one or more KTPs. According to some embodiments, processes and configurations for statistic profile based NICs include one or more software modules and executable instructions for a vehicle unit. The processes and configurations include operations by the software modules including a statistic counter feature of a NIC. Operations by the software modules can also include validation against predetermined profiles of network data and KTPs in a cyclic manner.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

FIG. 1 depicts a graphical representation of an NIDS according to one or more embodiments. According to some embodiments, systems, configurations and processes described herein are directed to vehicle systems including vehicle networks. FIG. 1 depicts a graphical representation of network for vehicles including a plurality of servers $105_{1-n}$, NICs $110_{1-n}$ and one or more vehicle units $115_{1-n}$. System 100 may also include additional elements and may be configured to service communication between devices and vehicle units $115_{1-n}$.

System 100 may relate to an automotive network or Ethernet connection associated with one or more entities, such as a vehicle manufacturer, vehicle service, etc. As shown in FIG. 1, vehicle units $115_{1-n}$ may relate to one or more of vehicle components and/or individual vehicles. In certain embodiments, elements of system 100 are configured to communicate with one or more other devices including diagnostic devices, service stations, and roadway units.

In some embodiments, system 100 may be configured to operate with autonomous vehicles and assistive driving systems. Accordingly, network traffic can include data provided from other vehicles, data provided from roadway infrastructure, data provided from mobile devices, etc.

In various embodiments discussed herein, vehicle network traffic may include network traffic associated with a vehicular network backbone. For some embodiments, vehicle network traffic may include traffic associated with a Controller Area Network (CAN) based backbone, or a Local Interconnect Network (LIN) based backbone. For some embodiments, vehicle network traffic may include traffic associated with another vehicular network backbone, such as an Ethernet-based vehicular network backbone. Accordingly, vehicle network traffic may include communication between devices internal to a vehicle and/or communication with devices external to the vehicle. Communication between devices internal to a vehicle may advantageously be well-tested during development, and may accordingly support well-characterized KTPS as discussed herein.

System 100 may be configured to detect network intrusions with respect to traffic statistic parameters. According to some embodiments, access points of devices to the network 100 may be through at least one of NICs $110_{1-n}$. According to some embodiments, NICs $110_{1-n}$ support several traffic statistic parameters in hardware so that no performance overhead is required to create statistic parameter. In addition, KTPs may be created for the NICs $110_{1-n}$ during one or more of development, testing and use of system 100. In some embodiments, the KTPs are cyclically checked against the real traffic statistics, such as a source of NIC hardware statistic parameters, inside each network endpoint. If dissonance is detected relative to network data and the KTPs, at least one of the NICs $110_{1-n}$ can report the violation. In certain embodiments, a firewall may be activated in response to a violation. In other embodiments, detection and reporting of violations may be performed within a switch of system 110.

System 100 allows for a NIDS that does not require modelling or machine learning for the estimation of good cases needed (which generally requires a high performance level and operations performed during system runtime). In addition, by using tested systems and KTPs, acceptable or good network data may be determined. As such, good cases profiles may be created (e.g., during network evaluation) and then stored in devices for use during runtime. System 100 also allows for runtime statistic parameters to be determined based on statistics of the NICs. As such, performance testing of the NICs may not be required for KTP determination. According to some embodiments, system 100 may account for low performance during runtime needed as only the NIC hardware statistic registers (e.g., registers for storing NIC hardware statistic parameters) have to be read and compared with the KTPs.

According to some embodiments, system 100 and processes described herein are configured based on an Open Systems Interconnection (OSI) layer 2/driver layer based NIDS. In contrast to NIDS located in OSI layer 3, 4 or 5, a prevention mechanism of system 100 can also take place in the driver which has the lowest impact to the device. For example, with respect to a flooding intrusion, if all received 'flood packets' are given to the higher layers to be discarded, a much higher performance is required and abnormal device behavior may be caused. If the flooding intrusion is detected and discarded by the driver itself, NICs $110_{1-n}$ can could use a receive hardware filter so that again not much performance is needed for prevention.

As discussed herein, an intrusion may be initiated over an existing interface of a vehicle (such as, for example, a wireless LAN (WLAN) interface, or an On-board diagnostics (OBD) interface). However, in various embodiments, an intrusion may be initiated in other ways and/or by various devices in a vehicular network. For example, an intrusion may be initiated through a device (such as a sensor, or an actuator) connected to a vehicular network backbone (such as an Ethernet-based backbone). The capability to detect intrusions through such devices may be advantageous, since such devices may be accessible at an external surface of a vehicle.

According to some embodiments, system 100 uses NIC hardware statistics. KTPs may be created for the network out of good test cases.

Moreover, KTPs as discussed herein may be capable of identifying intrusions involving intelligent malware. For example, malware may be installed or otherwise introduced into a network (e.g., for a Central Processing Unit (CPU) in communication with a vehicular network backbone), and may supervise existing network communication. The malware may then attempt to extract an observed pattern from the supervised communication and send that observed pattern randomly and/or more frequently to another device in the network, in order to disturb or disrupt it. KTPs as discussed herein may advantageously be capable of detecting such intrusions.

Figure 2:
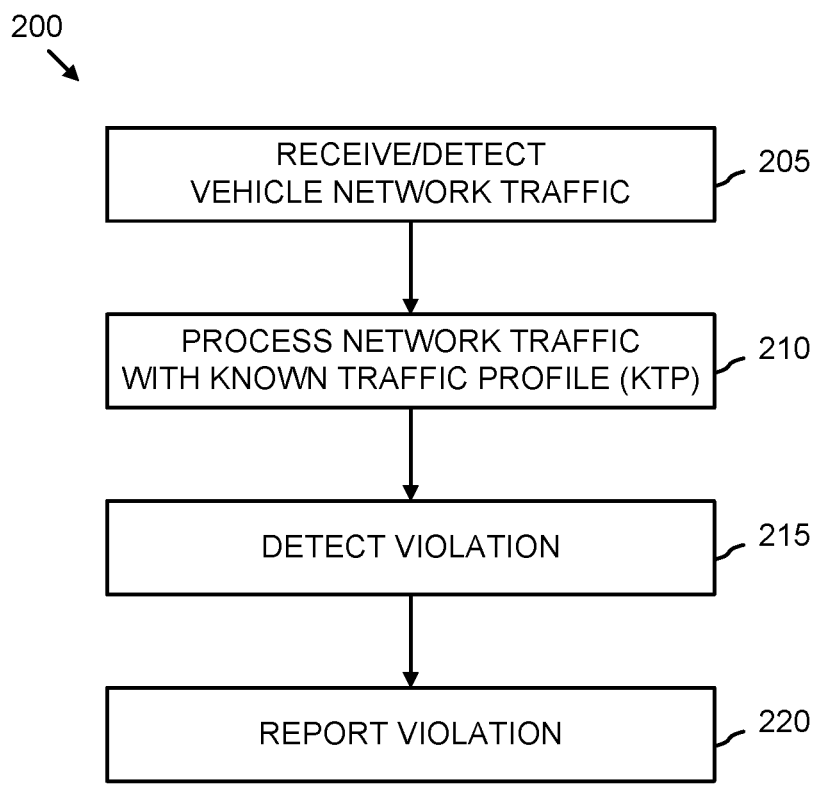
FIG. 2 depicts a process for network intrusion detection, according to one or more embodiments.

FIG. 2 depicts a process for network intrusion detection according to one or more embodiments. Process 200 may be performed by a vehicle unit (e.g., vehicle units $115_{1-n}$ of FIG. 1) of an NIDS according to one or more embodiments.

According to some embodiments, process 200 includes receiving and/or detecting vehicle network traffic at block 205, processing network traffic with one or more KTPs at block 210, detecting a violation of the KTPs at block 215, and reporting violations of the KTPs at block 220.

At block 205, vehicle network traffic is received by a NIC (e.g., NICs $110_{1-n}$). The network traffic may be analyzed by processing the traffic with respect to one or more KTPs at block 210. The KTPs may provide one or more KTPs to identify network traffic which violates one or more system policies. According to some embodiments, network traffic is analyzed at block 210 using one or more coexisting KTPs. Detecting a violation of KTPs can be based on a plurality of coexisting KTPs. According to some embodiments, KTPs can provide one or more parameters describing acceptable and unacceptable (e.g., violations) characteristics associated with network timing. According to some embodiments, the NIDS can check for transitions of KTP-parameters from one allowed value/range into another allowed value/range. In addition to detection of a violation, KTPs may provide indications of the network violation and be utilized in one or more actions or processes in response to network violations.

At block 210, one or more KTPs can be utilized concurrently. In certain embodiments, the KTPs may have a timing relationship with each other. The timing relationship may be used at block 210 to assess network data. In some embodiments, abnormal behavior and/or violations are determined at block 210 based on one or more timing characteristics of vehicle network data. Timing characteristics may be based on related timing parameters including time synchronization relative to one or more vehicles (e.g., shared vehicle understanding of time), scheduling and traffic shaping (e.g., parameters for exchange of communication packets), communication path selection including bandwidth and time slot selection, and Time Sensitive Networking (TSN) parameters in general. In certain embodiments, one or more co-existing KTPs may be excluded from evaluation of network data. According to some embodiments, KTPs may be combined using logical connections including one or more of AND, OR, NOT, and parentheses for analysis of network data. That is, any combination of KTPs (and/or their exclusions) may be utilized by the methods and systems disclosed herein; and those combinations may be, for example, specified using Boolean-algebraic operators and notation (for example, AND, OR, and NOT, possibly expressed in combinations using parentheses).

At block 215, a violation is detected when network traffic violates one or more KTPs. By way of example, violation of a KTP may be detected when address frames and/or network traffic includes frame rates not specified by a KTP.

At block 220, a violation of the KTP may be reported by a NIC. Reporting can include providing one or more of the network entity identify, data received, and violation to a network server. Processes and device configurations described herein can flag events or scenarios where network traffic violates one or more KTPs.

According to some embodiments, process 200 may be employed and/or incorporated into software modules of a statistic profile based NIC and/or as executable instructions for a vehicle unit. Process 200 may provide or work in combination with a statistic counter feature of a NIC. Operations of process 200 may be performed in a cyclic manner.

An exemplary process may include a NIC hardware statistic register counting the amount of received different Media Access Control (MAC) addressing modes: Broadcast, Multicast and Unicast at block 205. In some embodiments, the Institute of Electrical and Electronics Engineers (IEEE) audio streaming protocol 1722 for Audio Video Bridging (AVB) is using multicast addressing and it is of isochronous nature such that the amount of frames per second is always same and deterministic. For example, one specific 1722 traffic class uses 750 frames per second. With the 1722 protocol and using multicast addressing, the KTP for multicast addressing could include:

minimum 750 frames/s
maximum n*750 frames/s (n: maximum number of coexisting streams)
only integer multiples of 750 frames/s allowed 1 . . . n*750 frames/s If n=5, only 750, 1500, 2250, 3000 and 3750 frames/s are allowed.

According to some embodiments, violations of the system may be determined with frame rates not aligned to the system, such that any frame rate in between is considered abnormal. In certain embodiments stream activation/deactivation periods may be exceptions. Abnormal frame rates may be considered as intrusions.

In certain embodiments, if an abnormal situation is detected, there may be another cause other than intrusion, such as device/system malfunction. According to certain embodiments, process 200 could provide functional safety (FuSa) to report strange or particular network traffic. In some embodiments, process 200 can provide a device/system self-check that includes triggering the start of further/deeper test-action with respect to the violation.

In some embodiments, process 200 can provide iteration testing such that a particular iteration is determined as abnormal. Here the NIDS may be hosted in test equipment which could also generate KTPs. Deeper analysis may be provided regarding timing abnormality of the network data. In some embodiments, a timing abnormality check includes determining whether an abnormal timing s is causing a malfunction or at the edge of causing a malfunction.

According to some embodiments, detecting violation at block 215 includes an OSI layer 2 prevention. A NIDS can be located in a network driver and hardware features can be used for prevention. Special situations of the automotive market require highly optimized solutions. The lower in an OSI layer an intrusion is detected and prevented, the less impact to device/system performance. Also traditional IDPS like firewalls may be well know from attackers, so additional special IDPS will increase safety and for autonomous driving.

According to some embodiments, configurations and processes are provided for FuSa. Processes described herein for NIDS can be utilized in low performance devices. As such, the depth of a cyclic test could be adapted to the free performance or in other signal abnormal situations. For example, the depth of the test could be increased if the intrusion protection has higher priority than normal operations. Security of system 100 and FuSa will play more important roles in the future and automotive network architectures and cannot be compared with traditional WAN/LAN networks. As such, different NIDS concepts are needed.

According to some embodiments, a NIDS is supported from a switch of the network and network management devices can be part of the security concept of the system. In certain situations, the NIDS cannot be utilized due to cost pressure. However according to some embodiments NIDS switches with additional low performance cores for the switches.

Figure 3:
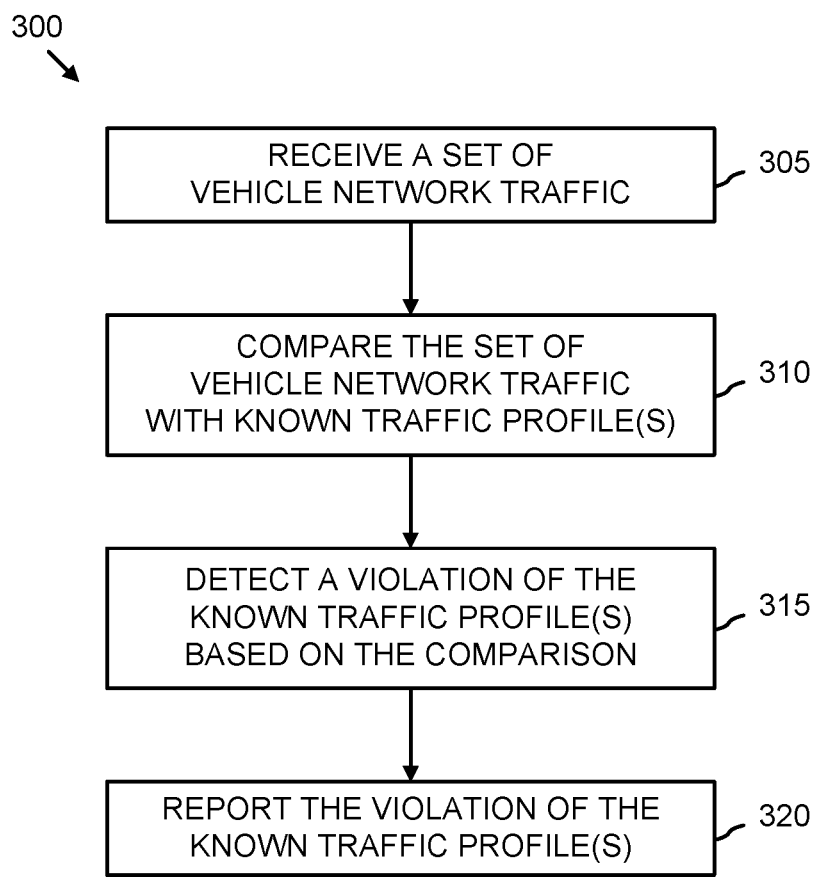
FIG. 3 depicts a method for detecting network intrusions, according to one or more embodiments.

FIG. 3 depicts a method for detecting network intrusions, according to one or more embodiments. In various embodiments, a vehicle network system (such as system 100 disclosed herein) and/or part of a vehicle network system (such as vehicle units $115_{1-n}$ disclosed herein) may be operable to perform methods such as a method 300. Method 300 may include a block 305, a block 310, a block 315, and a block 320.

At block 305, a set of vehicle network traffic may be received (e.g., by a NIC, such as NICs $110_{1-n}$) as disclosed herein. The vehicle network traffic may include data provided from other vehicles, data provided from roadway infrastructure, data provided from mobile devices, etc.

At block 310, one or more indicators of the set of vehicle network traffic (e.g., hardware statistic parameters as disclosed herein) may be compared with one or more KTPs. The KTPs may provide one or more parameters describing acceptable characteristics and/or unacceptable characteristics (e.g., violations), which may in turn be associated with network timing. In various embodiments, one or more KTPs can be utilized concurrently and/or with a co-existing timing relationship relative to each other. For some embodiments, one or more co-existing KTPs may be excluded from evaluation of network data. In some embodiments, one or more KTPs may be combined to provide use case profiling and verification. In various embodiments, the set of vehicle network traffic may be compared against any combination of KTPs.

At block 315, a violation of the KTPs may be detected based on the comparison. A violation may be determined based on one or more timing characteristics (e.g., network timing characteristics) associated with the vehicle network traffic, such as disclosed herein. At block 320, the violation of the KTPs may then be reported (e.g., by part of a NIC $110_{1-n}$). Reporting can include providing one or more of the network entity identify, data received, and violation to a network server.

In some embodiments, the detecting of the violation of the KTPs may include detecting that a timing relationship of the indicators of the set of vehicle network traffic falls outside of one or more timing relationships of the KTPs. For some embodiments, the one or more timing relationships of the KTPs may include a plurality of ranges of frames per second (which may be ranges of frames per second associated with a particular MAC addressing mode, such as ranges of frames per second specified by IEEE audio streaming protocol 1722 for AVB). In some embodiments, the detecting of the violation of the KTPs may be based on a transition from falling within a first allowed range of traffic-profile parameter values to falling within a second allowed range of traffic-profile parameter values (as disclosed herein).

For some embodiments, the detecting of the violation of the KTPs may be based on a combination of a plurality of the KTPs (such as a combination that may be specified by Boolean-algebraic operators and notation, as disclosed herein). In some embodiments, in addition to receiving the network traffic pattern, the NIC may perform at least one of: the comparing of the indicators of the set of vehicle network traffic; the detecting of the violation of the KTPs; and the reporting of the violation.

For some embodiments, the NIC may capture values for the indicators of the set of vehicle network traffic in a corresponding set of one or more storage elements (e.g., registers, or a RAM, or another suitable memory). In some embodiments, the KTPs may include parameters related to a communication request characteristic, a data exchange characteristic, a data pattern characteristic, an authentication characteristic, and/or a general network-data characteristic. For some embodiments, the KTPs may include a parameter related to a MAC addressing mode, the parameter having values corresponding to one or more of: a Broadcast mode, a Multicast mode, and a Unicast mode. In some embodiments, a firewall may be activated in response to the violation of the KTPs.

In various embodiments, a network intrusion detection system (such as system 100) or part of such a system, may perform portions of, or all of, process 200 and method 300.

Figure 4:
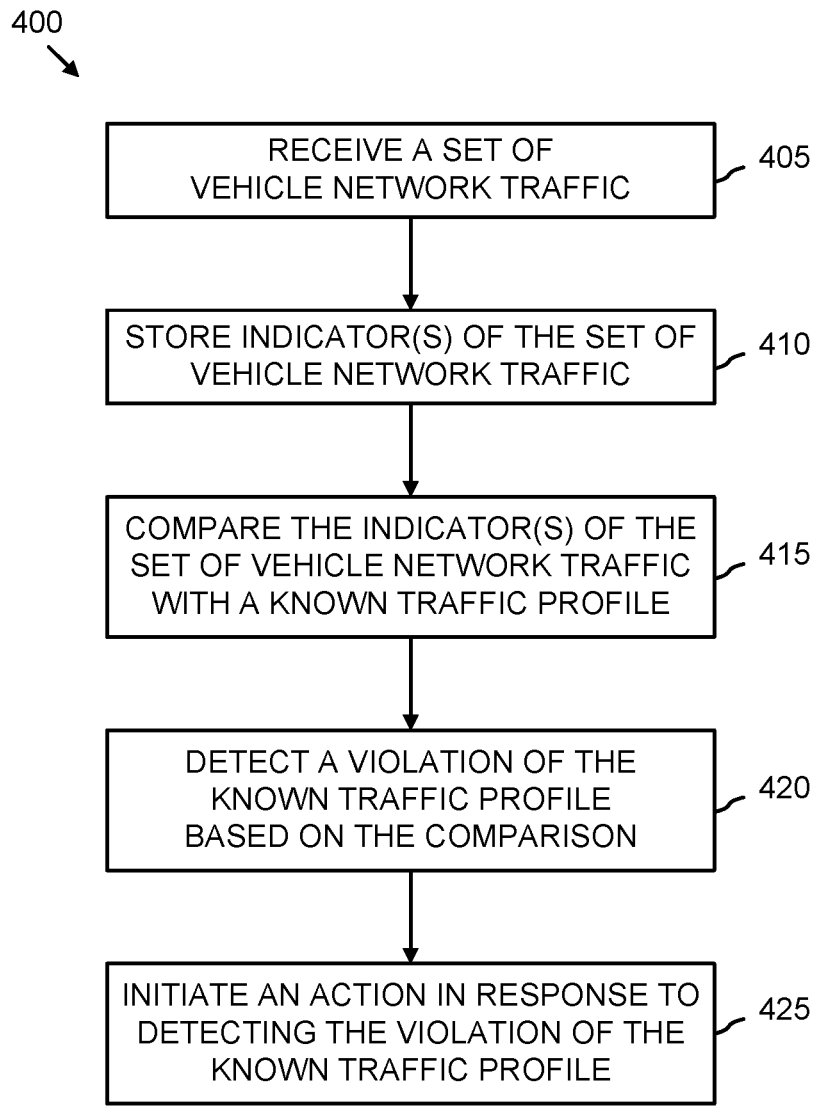
FIG. 4 depicts a method for using a network interface controller to detect network intrusions, according to one or more embodiments.

FIG. 4 depicts a method for using a network interface controller to detect network intrusions, according to one or more embodiments. In various embodiments, a vehicle network system (such as system 100 disclosed herein) and/or part of a vehicle network system (such as vehicle units $115_{1-n}$ disclosed herein) may be operable to perform methods such as a method 400. Method 400 may include a block 405, a block 410, a block 415, a block 420, and a block 425.

At block 405, a set of vehicle network traffic may be received by a NIC (e.g., NICs $110_{1-n}$) as disclosed herein. The vehicle network traffic may include data provided from other vehicles, data provided from roadway infrastructure, data provided from mobile devices, etc. At block 410, one or more indicators of the set of vehicle network traffic (e.g., hardware statistic parameters as disclosed herein) may be stored (e.g., hardware statistic registers as disclosed herein).

At block 415, the stored indicators of the set of vehicle network traffic may be compared with a KTP. The KTP may provide one or more parameters describing acceptable characteristics and/or unacceptable characteristics (e.g., violations), which may in turn be associated with network timing. In various embodiments, the KTP may comprise one or more KTPs utilized concurrently and/or with a co-existing timing relationship relative to each other. For some embodiments, the one or more KTPs utilized concurrently may be excluded from evaluation of network data. In some embodiments, the one or more KTPs utilized concurrently may be combined to provide use case profiling and verification. In various embodiments, the one or more KTPs utilized concurrently may be any combination of KTPs.

At block 420, a violation of the KTP may be detected based on the comparison. As disclosed herein, a violation may be determined based on one or more timing characteristics (e.g., network timing characteristics) associated with the vehicle network traffic. At block 425, an action may be initiated response to detecting the violation of the KTP. The action may comprise a report (as disclosed herein), or another action or process initiated in response to network violations, such as triggering the start of further/deeper test-actions.

In some embodiments, the detecting of the violation of the KTP may include detecting that a timing relationship of the set of vehicle network traffic falls outside of a timing relationship of the KTP. For some embodiments, the KTP may include, or may be specified with respect to, a plurality of ranges of frames per second (such as ranges of frames per second associated with particular MAC addressing modes, as disclosed herein). In some embodiments, the stored indicators may include one or more hardware statistic parameters. For some embodiments, the action initiated in response to detecting the violation of the KTP may include performing a test of the NIC.

In various embodiments, a network intrusion detection system (such as system 100) or part of such a system, may perform portions of, or all of, process 200, method 300, and/or method 400.

The description of embodiments has been presented for purposes of illustration and description. Suitable modifications and variations to the embodiments may be performed in light of the above description or may be acquired from practicing the methods. For example, unless otherwise noted, one or more of the described processes and methods may be performed by a suitable device and/or combination of devices, such as the systems described above with respect to FIGS. 1-4. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for detecting network intrusions, the method comprising:
   receiving, by a Network Interface Controller (NIC), a set of vehicle network traffic;
   comparing one or more indicators of the set of vehicle network traffic with one or more known traffic profiles;
   detecting a violation of the known traffic profiles based on the comparison and based on a transition from falling within a first allowed range of traffic-profile parameter values to falling within a second allowed range of traffic-profile parameter values, wherein the detecting includes an Open Systems Interconnection (OSI) layer 2 prevention; and
   reporting the violation of the known traffic profiles.

2. The method of claim 1, wherein the detecting of the violation of the known traffic profiles includes detecting that a timing relationship of the indicators of the set of vehicle network traffic falls outside of one or more timing relationships of the known traffic profiles.

3. The method of claim 2, wherein the one or more timing relationships of the known traffic profiles include a plurality of ranges of frames per second.

4. The method of claim 1, wherein the detecting of the violation of the known traffic profiles is based on a combination of a plurality of the known traffic profiles.

5. The method of claim 1, wherein the NIC performs at least one of: the comparing of the indicators of the set of vehicle network traffic; the detecting of the violation of the known traffic profiles; and the reporting of the violation.

6. The method of claim 1, wherein the NIC captures values for the indicators of the set of vehicle network traffic in a corresponding set of one or more storage elements.

7. The method of claim 1, wherein the known traffic profiles include parameters related to one or more of: a communication request characteristic; a data exchange characteristic; a data pattern characteristic; an authentication characteristic; and a general network-data characteristic.

8. The method of claim 1, wherein the known traffic profiles include a parameter related to a Media Access Control (MAC) addressing mode, the parameter having values corresponding to one or more of: a Broadcast mode, a Multicast mode, and a Unicast mode.

9. The method of claim 1, further comprising:
   activating a firewall in response to the violation of the known traffic profiles.

10. A method for using a Network Interface Controller (NIC) to detect network intrusions, the method comprising:
    receiving, by the NIC, a set of vehicle network traffic;
    storing one or more indicators of the set of vehicle network traffic;
    comparing the stored indicators of the set of vehicle network traffic with a known traffic profile;
    detecting a violation of the known traffic profile based on the comparison and based on a transition from falling within a first allowed range of traffic-profile parameter values to falling within a second allowed range of traffic-profile parameter values; and
    initiating an action in response to detecting the violation of the known traffic profile,
    wherein the detecting of the violation of the known traffic profile includes detecting that a timing relationship of the set of vehicle network traffic falls outside of a timing relationship of the known traffic profile.

11. The method of claim 10, wherein the known traffic profile includes a plurality of ranges of frames per second.

12. The method of claim 10, wherein the stored indicators include one or more hardware statistic parameters.

13. The method of claim 10, wherein the action initiated in response to detecting the violation of the known traffic profile includes performing a test of the NIC.

14. A network intrusion detection system, comprising:

an input operable to receive vehicle network traffic;

a Network Interface Controller (NIC) coupled to the input; and a processor having executable instructions stored in a non-transitory memory that, when executed, cause the processor to:

store one or more NIC hardware statistic parameters of the vehicle network traffic in one or more NIC hardware statistic registers;

compare the NIC hardware statistic parameters of the vehicle network traffic with one or more known traffic profiles;

detect a violation of the known traffic profiles based on the comparison and based on a transition from falling within a first allowed range of traffic-profile parameter values to falling within a second allowed range of traffic-profile parameter values; and initiate an action in response to detecting the violation of the known traffic profiles.

15. The network intrusion detection system of claim 14, wherein detecting the violation of the known traffic profiles includes detecting that a timing relationship of the vehicle network traffic falls outside of one or more timing relationships of the known traffic profiles.

16. The network intrusion detection system of claim 14, wherein the NIC comprises the processor.

17. The network intrusion detection system of claim 14, wherein the known traffic profiles include parameters related to one or more of: a communication request characteristic; a data exchange characteristic; a data pattern characteristic; an authentication characteristic; and a general network-data characteristic; and wherein the known traffic profiles include a parameter related to a Media Access Control (MAC) addressing mode, the parameter having values corresponding to one or more of: a Broadcast mode, a Multicast mode, and a Unicast mode.

18. The network intrusion detection system of claim 14, wherein the NIC hardware statistic registers include one or more registers for counting an amount of the vehicle network traffic corresponding to one or more of: a Broadcast Media Access Control (MAC) addressing mode; a Multicast MAC addressing mode; and a Unicast MAC addressing mode.

* * * * *